June 24, 1941.　　　S. L. WESSEL　　　2,246,770
ANIMAL FOOD
Filed March 6, 1939
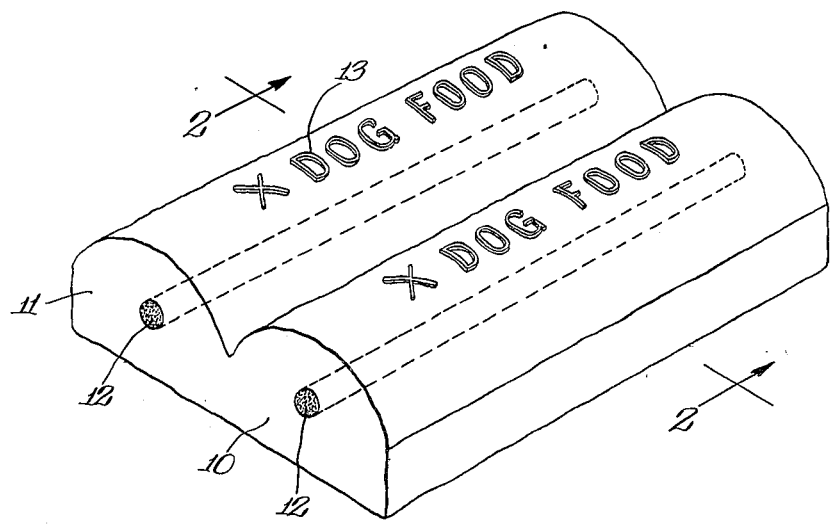
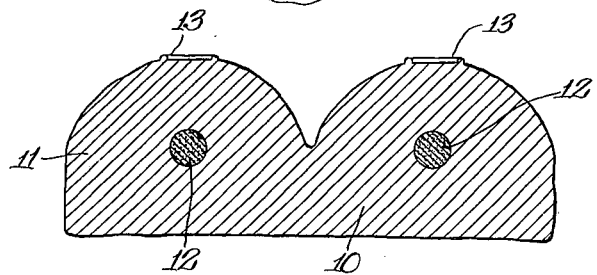
INVENTOR.
Stanley L. Wessel,
BY
ATTORNEY.

Patented June 24, 1941

2,246,770

UNITED STATES PATENT OFFICE 2,246,770

ANIMAL FOOD

Stanley L. Wessel, Glencoe, Ill.

Application March 6, 1939, Serial No. 260,009

2 Claims. (Cl. 99—2)

My invention relates to animal foods and particularly to foods for dogs or cats.

The principal object of my invention is to provide a food in the form of a loaf, biscuit, or cake having permanently incorporated therein means for positively identifying the product as an animal food and designating it as undesirable for human consumption.

This provision is necessary for two reasons. First, to protect those who cannot read English, and, second, to protect the public against unscrupulous dealers who might be induced to substitute the food intended for animals for food suitable for human consumption.

In order to "denature" the product within the meaning of the above discussion, I provide a core or vein within the body of the material, composed of a material of sharply contrasting color, the material of which the core is composed being edible or at least harmless to the animal. In addition, I prefer to emboss words indicating the character of the product in the body of the cake or loaf.

In practice it is intended that the particular animal food shall be dispensed in a "fresh" condition; that is, it may be partly or entirely cooked, but will not keep indefinitely without spoiling. It will be furnished at intervals by the packer to establishments having refrigerating facilities and dispensed along with other products that are intended for human consumption. To avoid the possibility that the cakes or loaves be kneaded in order to efface any identifying markings, I preferably utilize a material in the core that will act to discolor the entire body of material as soon as it is disseminated, as would occur when the loaf was kneaded. I have found that finely divided charcoal is eminently suited for the purpose, a small quantity of which in the composition of the core will act to turn the entire mass of material a very dark or black color if any attempt is made to change the distinctly segregated condition of the components as prepared.

The product and method of preparing it will be better understood in reference to the accompanying drawing, in which;

Fig. 1 is a perspective view of a double loaf of a dog food as constructed in accordance with my invention; and, Fig. 2 is a sectional view on the line 2—2 of Fig. 1.

In the process of manufacture, I intermix suitable quantities of meat and the other constituents that go to make up the desired food. I then separately combine a quantity of the same material, together with powdered or finely divided charcoal, cod liver oil and, perhaps, powdered milk or some other ingredient that is recommended for the diet of the particular animal, the resultant product being black and viscous in appearance. The two separately mixed products are then delivered to a filling or stuffing machine in such manner that the black material is segregated in the center of the loaf or biscuit and extends from end to end thereof in such manner as to be visible at both ends. In the process the loaf is compressed under relatively high pressure and may thereafter be handled with ease, although it will preferably be marketed within a package having a transparent wrapping. The two loaves or cakes 10, 11 may readily be broken apart and the individual loaves may be broken as desired. In any case, however, the veins or cores 12 will be visible at at least two points on the loaf and the sharply contrasting color and unappetizing appearance will immediately warn a purchaser that the product is not intended for human consumption. Should the dealer attempt to efface the identification by kneading the loaf, the entire mass of material will assume a black or very dark appearance and provide a certain warning to any purchaser.

Preferably I provide words 13 embossed into an upper surface of the loaves that serve to identify the product, a trade-mark or trade name being associated therein.

While I have described the use of charcoal as a means for denaturing or providing a contrasting color, it is obvious that other materials may be used that will provide different colors, some material being selected, of course, that is edible or at least harmless to the animals. By the foregoing description it should not be understood that I intend to exclude from the idea the use of a solid core, such, for example, as a stick of wood which the user would remove before feeding the material to the animal. The idea in general is to provide a sure means of distinguishing and identifying the product not intended for human use.

I claim:

1. An article of manufacture, composed of food suitable for animals, said article being in the form of a compact cake and provided with a core composed of ingredients in which finely divided charcoal is incorporated, the ends of the core being visible from at least two points on said cake.

2. As a new article of manufacture, a compact cake of animal food having a core or vein in which charcoal and edible oil are ingredients, said core serving as a means for warning against use of the article for human food.

STANLEY L. WESSEL.